United States Patent
Dullni

(10) Patent No.: US 10,014,140 B2
(45) Date of Patent: Jul. 3, 2018

(54) MEDIUM VOLTAGE CIRCUIT BREAKER FOR THE USE IN HIGH PRESSURE ENVIRONMENTS

(71) Applicant: ABB Schweiz AG, Baden (CH)

(72) Inventor: Edgar Dullni, Ratingen (DE)

(73) Assignee: ABB Schweiz AG, Baden ( * ) Notice: Subject to any disclaimer, the term of this patent is extended or adjusted under 35 U.S.C. 154(b) by 0 days.

(21) Appl. No.: 15/373,501

(22) Filed: Dec. 9, 2016

(65) Prior Publication Data
US 2017/0169973 A1    Jun. 15, 2017

(30) Foreign Application Priority Data

Dec. 11, 2015   (EP) ..................................... 15199610

(51) Int. Cl.
| | |
|---|---|
| *H01H 33/662* | (2006.01) |
| *H01H 33/64* | (2006.01) |
| *H01H 33/66* | (2006.01) |
| *H01H 33/666* | (2006.01) |

(Continued)

(52) U.S. Cl.
CPC .......... *H01H 33/662* (2013.01); *H01H 33/64* (2013.01); *H01H 33/6606* (2013.01); *H01H 33/666* (2013.01); *H01H 33/66238* (2013.01); *H02B 13/045* (2013.01); *H01H 33/66207* (2013.01); *H02B 13/0354* (2013.01)

(58) Field of Classification Search
CPC .. H01H 33/662; H01H 33/64; H01H 33/6606; H01H 33/66238; H01H 33/565; H01H 33/666; H01H 33/022; H01H 2071/088; H01H 2071/506; H01H 9/04; H01H 33/66207; H02B 13/00; H02B 13/045; H05K 7/00
USPC .................. 218/139, 134, 138, 135, 155, 118
See application file for complete search history.

(56) References Cited

U.S. PATENT DOCUMENTS

| | | | | |
|---|---|---|---|---|
| 3,522,404 | A | * | 8/1970 | Trayer ..................... H01H 9/16 174/18 |
| 3,845,263 | A | * | 10/1974 | Dickinson ............ H01H 33/666 200/275 |

(Continued)

FOREIGN PATENT DOCUMENTS

| | | |
|---|---|---|
| DE | 4123710 A1 | 1/1992 |
| DE | 102007008599 B3 | 11/2008 |

(Continued)

*Primary Examiner* — Renee S Luebke
*Assistant Examiner* — William Bolton
(74) *Attorney, Agent, or Firm* — Leydig, Voit & Mayer, Ltd.

(57) ABSTRACT

A medium voltage circuit breaker for the use in high pressure environments has a vacuum interrupter with a fixed contact side and a movable contract side with a movable rod, and a drive in pressure tight insulating housing, electrical terminals to the vacuum interrupter integrated into the pressure housing, and a further pressure tight housing attached pressure tightly at the insulating housing at the movable contact side of the vacuum interrupter with the movable rod, and that the inner volume of the insulating pressure tight housing gastightly separated from the inner volume of the further pressure tight housing by a bellows, through which the movable rod is guided through and mechanically coupled to a drive, which is arranged inside the further housing.

4 Claims, 2 Drawing Sheets

(51) Int. Cl.
*H02B 13/045* (2006.01)
*H02B 13/035* (2006.01)

(56) References Cited

U.S. PATENT DOCUMENTS

| | | | | |
|---|---|---|---|---|
| 4,150,270 | A * | 4/1979 | Zunick | H01H 33/66 218/138 |
| 5,191,180 | A | 3/1993 | Kitamura et al. | |
| 5,206,616 | A * | 4/1993 | Stegmuller | H01H 33/666 335/126 |
| 5,808,258 | A * | 9/1998 | Luzzi | H01H 33/66207 218/136 |
| 6,927,355 | B2 * | 8/2005 | Thuresson | H01H 33/36 218/84 |
| 7,397,012 | B2 * | 7/2008 | Stepniak | H01H 33/02 218/155 |
| 7,563,161 | B2 * | 7/2009 | Perret | H01H 33/6661 463/13 |

FOREIGN PATENT DOCUMENTS

| | | |
|---|---|---|
| EP | 1942514 A1 | 7/2008 |
| WO | WO 2009012788 A1 | 1/2009 |

\* cited by examiner

MEDIUM VOLTAGE CIRCUIT BREAKER FOR THE USE IN HIGH PRESSURE ENVIRONMENTS

CROSS-REFERENCE TO RELATED APPLICATIONS

Priority is claimed to European Patent Application No. 15 199 610.5, filed on Dec. 11, 2015, the entire disclosure of which is hereby incorporated by reference herein.

FIELD

The invention relates to a medium voltage circuit breaker for the use in high pressure environments.

BACKGROUND

The state of the art in general is shown in the FIG. 2. An insulating housing, that contains a switching element is located in an environment of high pressurized fluid. For example this can be a vacuum interrupter in a subsea application. The vacuum interrupter must not get in touch with the high pressures, which can reach 300 bar. Therefore a pole part is needed, that withstands the pressure and keeps an atmospheric environment of 1 bar inside. The high pressurized fluid around is insulating oil. This is in an enclosure on the seabed in order to prevent damage from contact with the seawater.

For the electrical connection to the switching element, a conducting lid is used. Furthermore there is arranged a conducting ring. These contacts have to provide a good electrical connection. As well, they are part of the housing and have to be tight against leakage and stable against the pressure on the outside environment at high pressure level.

In line with the vacuum interrupter, there is a drive, that operates on low voltage level. To have this appropriate for a medium voltage application, the housing parts have to be made of insulating material. Furthermore the volume can be filled with an insulating gaseous medium like SF6.

Such well known construction leads to the following disadvantages. The design according to FIG. 2 results in certain design criteria to fulfil electrical and mechanical requirements. The switching element and the drive are accommodated in the same housing.

But this results in relatively long distances to insulate the different potentials from each other. As a low voltage device connected to a control, the drive must not be affected by the high voltage in its vicinity.

SUMMARY

An aspect of the invention provides a medium voltage circuit breaker for the use in high pressure environments, the breaker comprising: a vacuum interrupter including a fixed contact side and a movable contact side including a movable rod, and a drive in an insulating housing, which insulating housing is pressure tight; first and second electrical terminals to the vacuum interrupter integrated into the insulating housing; and a further housing, attached pressure tightly at the insulating housing at the movable contact side of the vacuum interrupter with the movable rod, the further housing also being pressure tight, wherein an inner volume of the insulating housing is gastightly separated from the inner volume of the further pressure tight housing by a bellows, through which bellows the movable rod is guided through and mechanically coupled to a drive, wherein the drive is arranged inside the further housing.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

An aspect of the invention is to overcome the aforesaid problems, and to arrange drive and circuit breaker in a pressure tight housing arrangement, in a compact and effective way.

An aspect of the invention relates to a medium voltage circuit breaker for the use in high pressure environments, with a vacuum interrupter with a fixed contact side and a movable contact side with a movable rod, and a drive in pressure tight insulating housing, and electrical terminals to the vacuum interrupter integrated into the pressure housing.

Further advantageous embodiments are given by the depending claim.

The invention is, that a further pressure tight housing is attached pressure tightly at the insulating housing at the movable contact side of the vacuum interrupter with the movable rod, and that the inner volume of the insulating pressure tight housing is gastightly separated from the inner volume of the further pressure tight housing by a bellows, through which the movable rod is guided through and mechanically coupled to a drive, which is arranged inside the further housing.

So by that, the drive is separated from the vacuum interrupter in a separate housing. The inner volume of the vacuum interrupter containing housing and the drive containing housing can be filled with separated gas media.

In a further advantageous embodiment the insulating housing, this is the housing which contains the vacuum interrupter, is filled with sulfurhexafluoride $SF_6$ at a pressure of 1 Bar, and that the further housing is filled with air at a pressure of 1 Bar. Both housing are separated gastightly from each other.

In a further advantageous embodiment, the insulating housing is provided with a valve, which is located at that region, where the further pressure tight housing is pressure tightly attached to the insulating housing, in such, that the valve is located inside the inner volume of the further pressure tight housing.

Furthermore, the valve is used to fill the inner volume of the insulating housing with insulating gas, during assembling the circuit breaker.

In a last advantageous embodiment, the rod is made at least partly of electrically insulating material.

Figure 1:
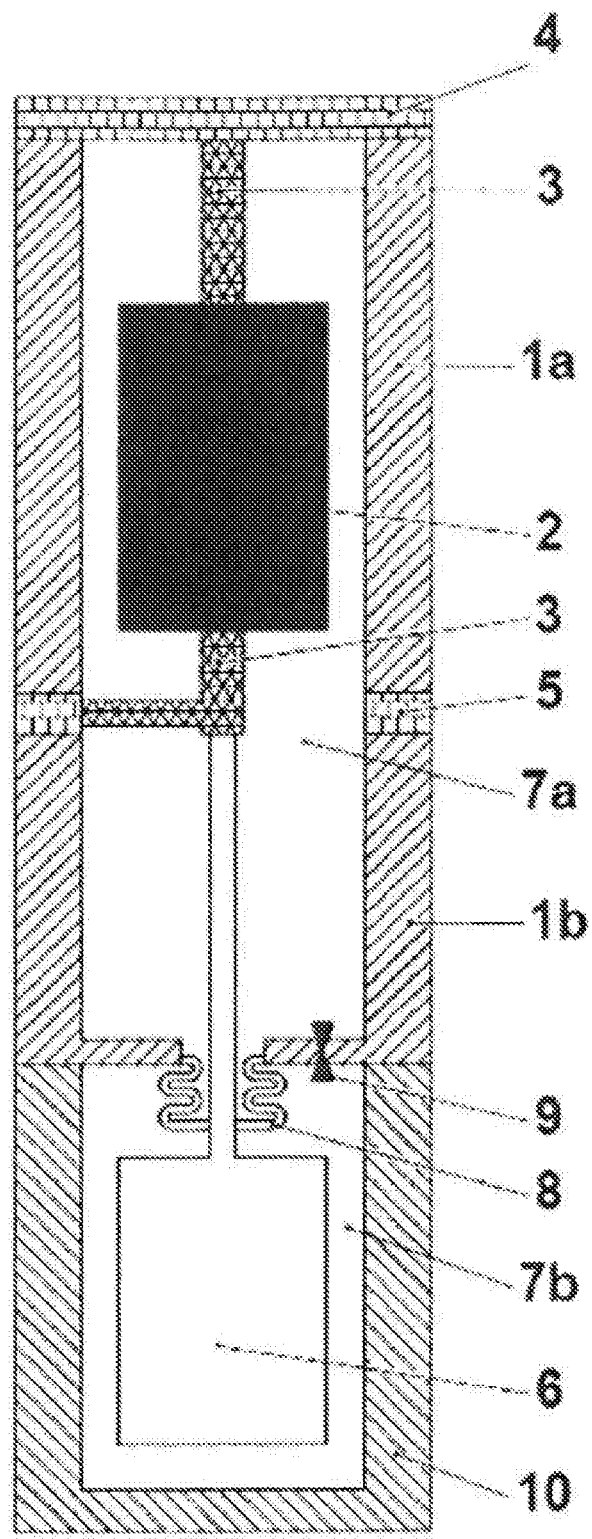
FIG. 1 side cut view through an invention related circuit breaker.

What is proposed in this invention is shown in FIG. 1 and disclosed as follows.

The inner volume of the housing is separated by a flexible membrane or bellows 8 belonging to insulating housing part 1b. This separation creates two compartments 7a and 7b.

While the volume 7a can be filled with an insulation gas like SF6, the volume 7b with the drive 6 stays e.g. under 1 atm air and is well insulated from the switching element 2. The volume 7a can also contain a higher pressure to improve the insulation properties. The membrane still allows a movement to operate the switching element with the drive. As an alternative to a membrane, this separation can also be realised with a feedthrough in form of a sealed piston.

As the compartment 7a needs to be filled with SF6 at 1 bar or slightly above, it needs to be evacuated and then filled with SF6. For this a valve 9 is required. The drive mechanism can be located in air at 1 bar, so it can be assembled without a need for evacuation or filling and needs therefore no filling valve. So the valve 9 can be positioned between 7a and 7b. The advantage is, that the valve is encapsulated to the inner side of the complete assembled pole, when 7a and 7b are combined. So it does not need to withstand the pressure difference of 300 bar to the outside.

Figure 2:
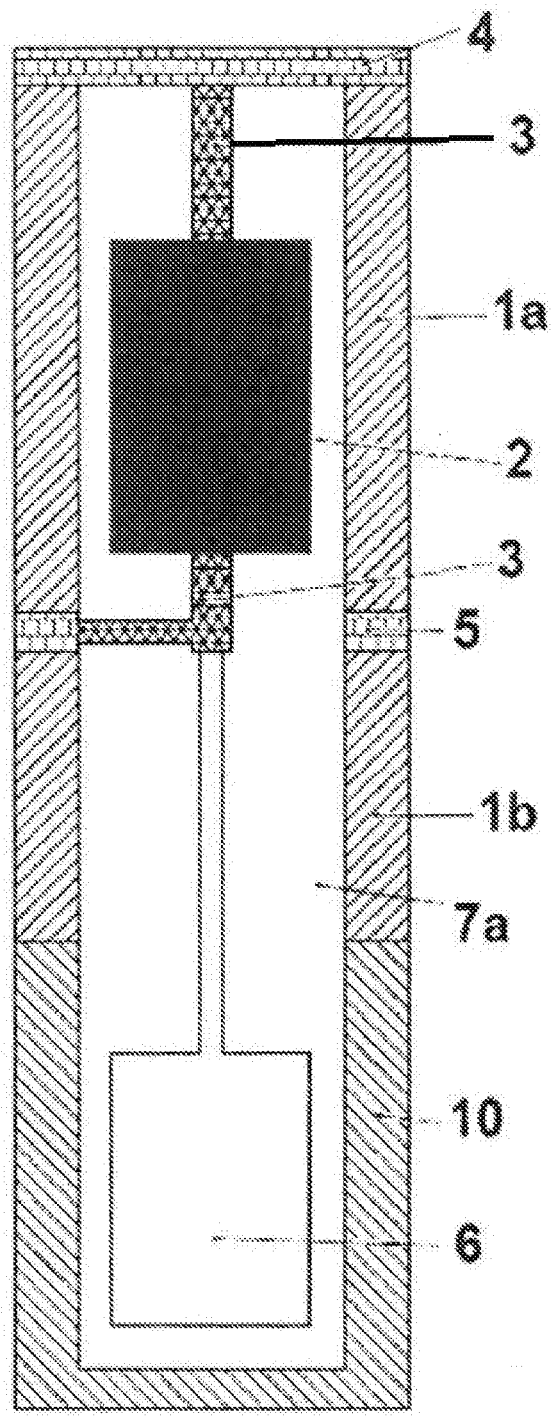
FIG. 2 state of the art.

In FIG. 2 is shown the state of the art like already mentioned at the introduction of the text above.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

The invention claimed is:

1. A medium voltage circuit breaker for the use in high pressure environments, the breaker comprising:
   a vacuum interrupter including a fixed contact side and a movable contact side including a movable rod in an insulating housing, which insulating housing is pressure tight;
   first and second electrical terminals to the vacuum interrupter integrated into the insulating housing; and
   a further housing, attached pressure tightly at the insulating housing at the movable contact side of the vacuum interrupter with the movable rod, the further housing also being pressure tight,
   wherein an inner volume of the insulating housing is gastightly separated from an inner volume of the further pressure tight housing by a bellows, through which bellows the movable rod is guided and mechanically coupled to a drive,
   wherein the drive is arranged inside the further housing,
   wherein the insulating housing is filled with $SF_6$ at a pressure of 1 bar,
   wherein the further housing is filled with air at a pressure of 1 bar, and
   wherein the insulating housing includes a valve arranged where the further housing is pressure tightly attached to the insulating housing, such that the valve is located inside the inner volume of the further housing.

2. The breaker of claim 1, wherein the movable rod comprises an electrically insulating material.

3. The breaker of claim 1, wherein the movable rod consists essentially of an electrically insulating material.

4. The breaker of claim 1, wherein the valve is configured to fill the inner volume of the insulating housing with insulating gas during assembling the circuit breaker.

* * * * *